United States Patent
Yoshikawa et al.

(10) Patent No.: US 6,542,193 B1
(45) Date of Patent: Apr. 1, 2003

(54) OPTICAL SYSTEM FOR TV CAMERA WITH STILL-TAKING FUNCTION

(75) Inventors: Kazuo Yoshikawa, Omiya (JP); Takami Hasegawa, Yokohama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/232,140

(22) Filed: Jan. 15, 1999

(30) Foreign Application Priority Data

Jan. 19, 1998 (JP) .......................................... 10-021446
Jan. 8, 1999 (JP) .......................................... 11-002840

(51) Int. Cl.⁷ .............................. H04N 9/07; G02B 5/04
(52) U.S. Cl. ..................................... 348/338; 359/834
(58) Field of Search .............................. 348/340, 344, 348/335, 336, 337, 338, 64, 220.1, 267, 262, 263, 265; 359/831–837; H04N 9/090, 09/097

(56) References Cited

U.S. PATENT DOCUMENTS 5,640,206 A * 6/1997 Kinoshita ................ 348/264
5,710,954 A   1/1998 Inoue
5,777,674 A * 7/1998 Ohmuro ................... 348/338
6,078,429 A * 6/2000 Lyon ....................... 359/634

OTHER PUBLICATIONS

Matchell "Colour TV Camera Performance The Marconi Mark IX Cameras," GEC Journal of Science & Technology, vol. 47, No. 1, Rugby, Gr. Britain, pp:17–24, 1981.

Schafer, et al. "A Comparison of Different HDTV–Standards Using Using Subjective and Objective Criteria," Signal Processing of HDTV, II, Turin, Aug. 30–Sep. 1, 198 L. Chiariglione (ed.), Elsevier Science Publishers, pp. 61–71, Aug. 30, 1989.

* cited by examiner

Primary Examiner—Wendy R. Garber
Assistant Examiner—Catherine Toppin
(74) Attorney, Agent, or Firm—Snider & Associates; Ronald R. Snider

(57) ABSTRACT

In a TV camera main body, a still-image-luminous-flux-decomposing prism is disposed adjacent to a color-decomposing prism of a TV-image-capturing system, whereby still images whose aberration is favorably corrected as with TV images are obtained in a simple and compact configuration. A mechanical shutter is disposed in an optical path of the still-image-capturing system, so as to prevent image blurring and smear from occurring due to temporal shifts between field images. A four-block color-decomposing prism 11A, in which each glass prism has a form identical to a color-decomposing prism of a dual green type, is constituted by a still-image-capturing prism 2d, and a TV-image-capturing three-color-decomposing prism system comprising a prism for blue 2a, a prism for red 2b, and a prism for green 2c. A mechanical shutter 34 is disposed between the light exit end face 7d of the still-image-capturing prism 2d and its cover glass 6d.

5 Claims, 5 Drawing Sheets

OPTICAL SYSTEM FOR TV CAMERA WITH STILL-TAKING FUNCTION

RELATED APPLICATIONS

This application claims the priorities of Japanese Patent Application No. 10-21446 filed on Jan. 19, 1998 and Japanese Patent Application No. 11-2840 filed on Jan. 8, 1999, which are incorporated herein by reference.

BACKGROUND OF THE INVENTION

1. Field of the Invention

The present invention relates to an optical system for a TV camera equipped with a still-taking function; and, in particular, to a TV camera optical system including a color-decomposing prism mounted in the main body of a broadcasting TV camera or the like.

2. Description of the Prior Art

In general, a broadcasting TV camera or the like is configured such that, for yielding a color image with a high image quality, a three-color-decomposing prism and CCDs corresponding to the respective color light components for obtaining object information carried by the decomposed individual color light components are mounted in the TV camera main body, whereas various kinds of lenses meeting the aimed purpose, such as zoom lens and macro lens, are made attachable to the front end of the TV camera main body.

In the middle of live TV broadcasting of a sports event or taking a video of a wedding ceremony, there is a demand for electrically recording a highlight scene such as a goal scene or a wedding-cake-cutting scene as a still image by the TV camera (including a video camera, ditto hereinafter) being used.

In order to fulfill such a demand, one frame of the moving picture electrically taken by the TV camera may be used as a still image. When preference is given to the compatibility with current NTSC signals, however, then thus obtained still image would exhibit a lower image quality.

Therefore, it is necessary that a TV lens section or TV camera main body be mounted with a dedicated image-capturing device for still images, such that the still images are obtained with a better image quality by the imaging system separate from the TV-image-capturing system. When two image-capturing systems are respectively provided with their lens sections, however, it becomes difficult to make the whole apparatus compact and inexpensive. Hence, it is preferred that at least a part of the TV lens section used in the TV-image-capturing system be commonly used for the still-image-capturing system.

In view of such circumstances, it is an object of the present invention to provide an optical system for a TV camera additionally equipped with a still-taking function, which can commonly use the respective optical systems of TV-image-capturing and still-image-capturing systems to the maximum.

It is also preferred that members constructed with a certain close relationship between both systems be used in optical members other than the lens sections as well, so as to make the apparatus compact and less expensive in terms of manufacturing cost.

It is thus another object of the present invention to provide an optical system for a TV camera equipped with a still-taking function, which can make the whole apparatus compact and less expensive in terms of manufacturing cost by establishing a close relationship between the respective optical systems of TV-image-capturing and still image-capturing systems.

Meanwhile, when capturing a still image, it is necessary that a part of temporally continuous object scenes be cut out with a shutter.

While an electronic shutter for changing the charge storage period of a CCD by altering the bias level or drive clock has been known, when the electronic shutter is employed, then smear may be enhanced by the light irradiated on the light-receiving surface of the CCD in the shutter-off state, whereby the image quality may deteriorate.

Though the occurrence of smear has recently been suppressed due to the development of vertical over-drain and np substrates as compared with the conventional level, further improvement is desired for those requiring a high image quality.

Therefore, it is still another object of the present invention to provide an optical system for a TV camera equipped with a still-taking function, in which there is no risk of smear being increased by light irradiating the light-receiving surface of the still-image-capturing device during the period in which the electronic shutter is closed.

Also, for example, when an electronic shutter is used in the case where the signal transmission system of the still-image-capturing device is of an interlacing type in conformity with NTSC or the like, then the charge storage periods of first and second fields constituting one frame shift from each other by $\frac{1}{60}$ second. As a consequence, in an object moving fast in particular, the first field picture and the second field picture may shift from each other, whereby blurring may occur when a frame image is constructed.

In view of such circumstances, it is still another object of the present invention to provide an optical system for a TV camera equipped with a still-taking function, which is free from blurring between two field images when the signal transmission system of its still-image capturing device is of an interlacing type.

When a mechanical shutter is disposed in an optical path of the still-image-capturing system in order to overcome the above-mentioned problem caused by the electronic shutter, it is necessary for the shutter member and a member for driving the shutter member to be disposed near the optical path, thus making it important to secure a space for disposing such members, which has not been necessary in the TV-image-capturing system.

Therefore, it is still another object of the present invention to provide an optical system for a TV camera equipped with a still-taking function which, when a mechanical shutter is used in the still-image-capturing system, a space for disposing its shutter member and a driving member therefor can be secured near the optical path.

SUMMARY OF THE INVENTION

The optical system for a TV camera equipped with a still-taking function in accordance with the present invention is an optical system for a TV camera having a color-decomposing prism disposed in a TV camera main body, the optical system comprising a still-image-luminous-flux-dividing prism, disposed adjacent to the color-decomposing prism, for dividing out a part of the luminous flux incident on the optical system such that thus divided part is guided to a still-image-capturing device.

Preferably, the color-decomposing prism is constituted by four blocks, one of which is used as the still-imageluminous-flux-dividing prism, whereas the remaining three blocks are used as respective color-decomposing prisms for three primary color light components.

Preferably, in the four blocks of the color-decomposing prism, the block closest to the luminous flux entrance side is used as the still-image-luminous-flux-dividing prism.

Preferably, a mechanical shutter is inserted in an optical path between the still-image-luminous-flux-dividing prism and the still-image-capturing device such as to attain an open state only during a charge storage period of the image-capturing device.

The still-image-capturing device is particularly effective when the signal transmission system is of an interlacing type.

Preferably, the luminous flux emitted from the still-image-luminous-flux-dividing prism forms an object image at a first imaging position and then, by way of a relay lens, forms the object image again on the still-image-capturing device disposed at a second imaging position, whereas a mechanical shutter is disposed between the first and second imaging positions.

DESCRIPTION OF THE PREFERRED EMBODIMENTS

In the following, embodiments of the present invention will be explained with reference to the accompanying drawings.

Figure 1:
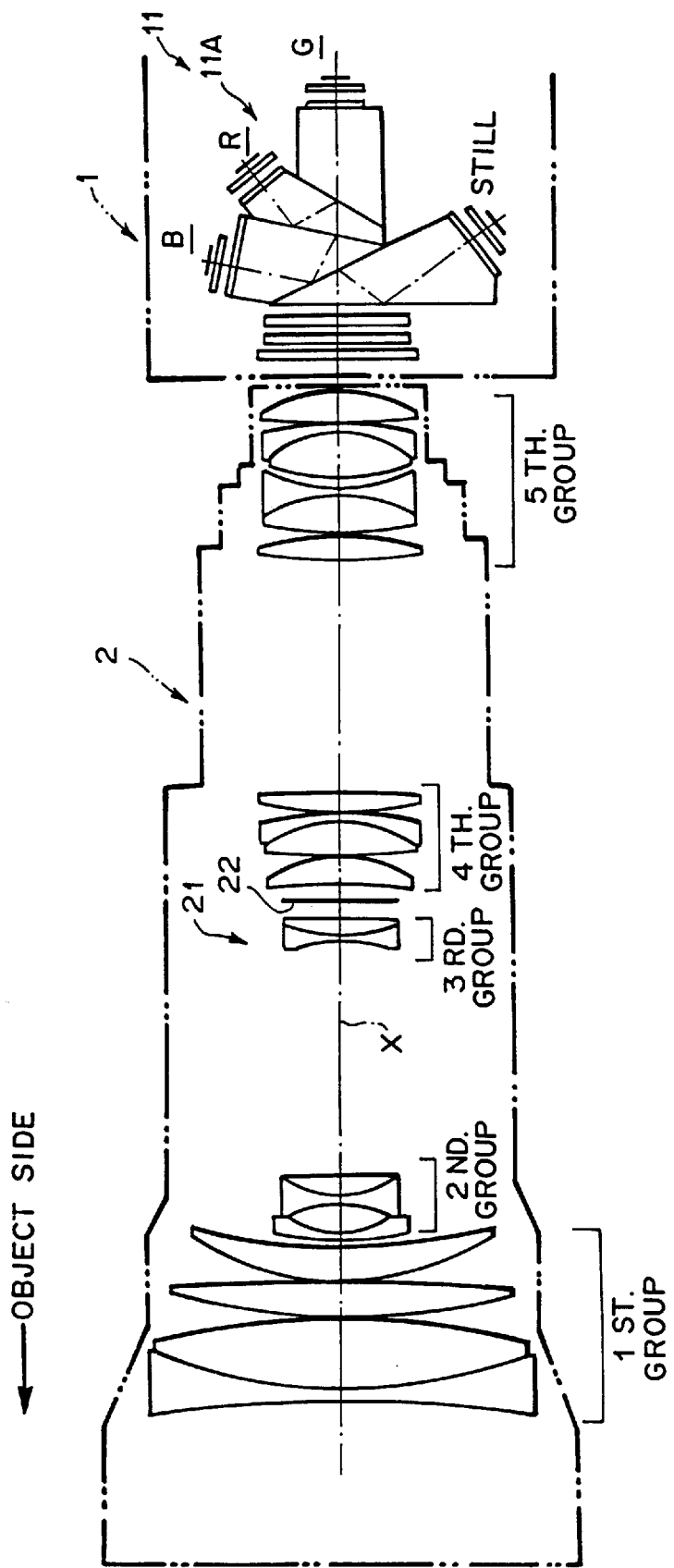
FIG. 1 is a schematic view showing a TV camera apparatus mounted with an optical system for a TV camera equipped with a still-taking function in accordance with an embodiment of the present invention.

FIG. 1 is a schematic view showing an embodiment of the optical system for a TV lens equipped with a still-taking function in accordance with the present invention. This optical system 11 is mounted to a TV camera main body 1, to which a TV lens system 2 is attached, and comprises a color-decomposing prism 11A constituted by four blocks.

Figure 2:
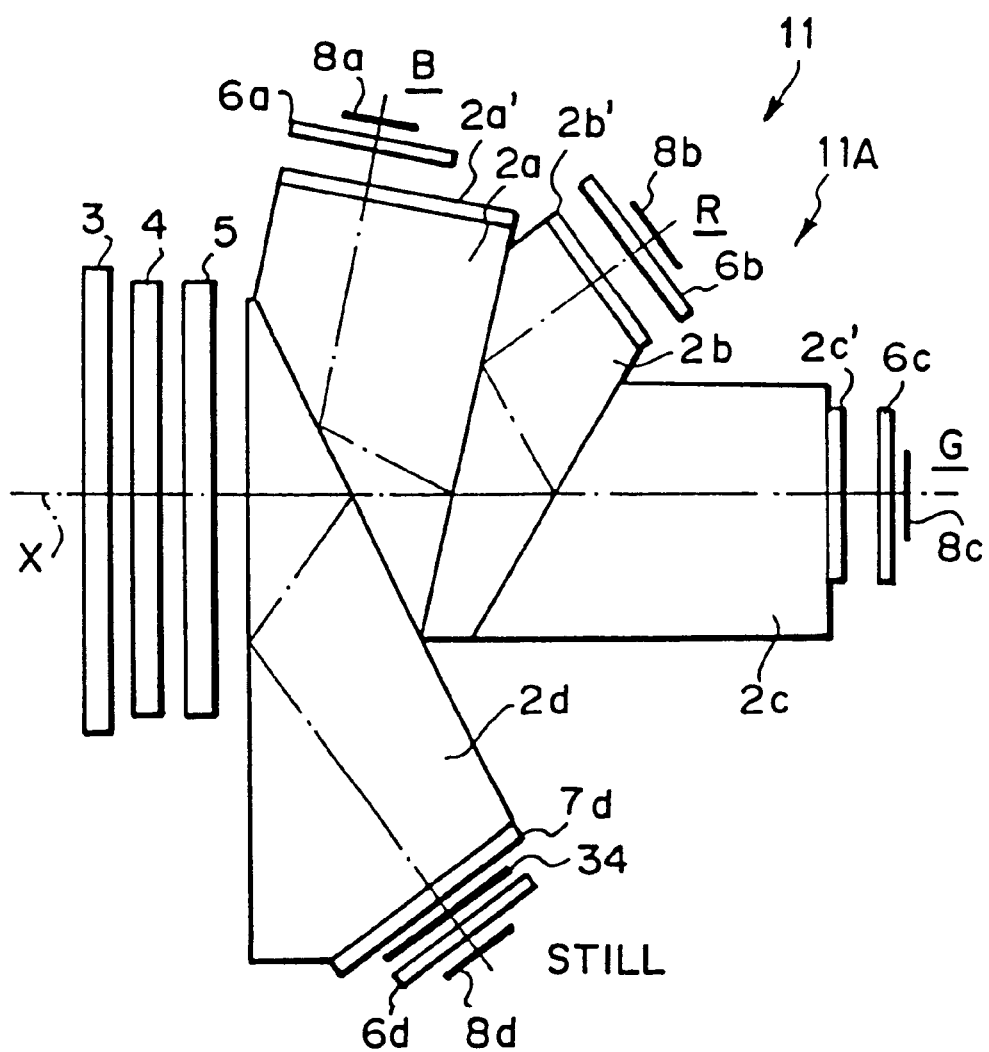
FIG. 2 is a schematic view showing the optical system for a TV camera shown in FIG. 1.

With reference to FIG. 2, the optical system 11 in accordance with this embodiment will now be explained in detail.

The optical system 11 comprises, successively from the luminous flux entrance side, filter members 3, 4, 5, a still-image-capturing prism 2d, and a three-color-decomposing prism system made of a prism for blue 2a, a prism for red 2b, and a prism for green 2c. In front of the prisms 2a to 2d, CCD image-capturing devices (e.g., each made of a (⅔)″-size, 1.3-million-pixel IT CCD) 8a to 8d are disposed by way of cover glasses 6a to 6d, respectively.

The filter members 3, 4, 5 are an infrared cutoff filter, an ND/color temperature conversion filter, and a low-pass filter, respectively.

In the color-decomposing prism 11 constituted by four blocks, each glass prism has the same shape as that of a dual green type color-decomposing prism (see Japanese Unexamined Patent Publication No. 8-62407) mounted in a high-definition camera compliant with HDTV (high-definition television) system. A minute air gap layer is farmed between the still-image-capturing prism 2d and the prism for blue 2a and between the prism for blue 2a and the prism for red 2b, whereas the prism for red 2b and the prism for green 2c are cemented together with a dichroic film interposed therebetween for reflecting the red light component. The surface of the still-image-capturing prism 2d facing the prism for blue 2a is coated with a half-mirror film. The surface of the prism for blue 2a facing the still-image-capturing prism 2d and the surface of the prism for red 2b facing the prism for blue 2a are each coated with an antireflection film. The surface of the prism for blue 2a facing the prism for red 2b is coated with a dichroic film for reflecting the blue light component.

As a consequence, the luminous flux incident on the still-image-capturing prism 2d is partly reflected by the half-mirror surface of the prism 2d facing the prism for blue 2a. Thus reflected part is totally reflected by the light entrance surface of the prism 2d so as to exit from the light exit end face 7d of the prism 2d, thereby entering the CCD image-capturing device 8d for still images by way of a mechanical shutter 34 and the cover glass 6d. Of the luminous flux transmitted through the half-mirror surface of the still-image-capturing prism 2d facing the prism for blue 2a, only the blue light component is reflected by the dichroic mirror surface of the prism for blue 2a facing the prism for red 2b. Thus reflected blue light component is then totally reflected by the surface of the prism 2a facing the still-image-capturing prism 2d. Only the red light component is reflected by the dichroic mirror surface of the prism for red 2b facing the prism for green 2c, so as to be totally reflected by the surface of the prism 2b facing the prism for blue 2a. Thus, the luminous flux is decomposed into three primary color components of B, R, G. Trimming filters 2a', 2b', 2c' for adjusting spectroscopic characteristics of B, R, G are attached to the exit surfaces of the prisms 2a, 2b, 2c, respectively. In the end, the blue, red, and green light components are made incident on their corresponding CCD image-capturing devices 8a, 8b, 8c, respectively.

In the CCD image-capturing devices 8a to 8d, on which the respective object images are formed by the still-image luminous flux and the individual color light components, each item of object image information is photoelectrically converted at a predetermined sampling cycle, and then the resulting electric signals for the respective colors from the CCD image-capturing devices 8a to 8c for the individual colors are combined together, so as to reproduce a color TV image of the object, whereas a still color image of the object is reproduced by the electric signal from the CCD imaging device 8d for still images.

On the other hand, the TV lens system 2 comprises zoom lens groups 21 made of five groups as shown in FIG. 1.

The zoom lens groups 21 comprise, successively from the object side, a positive first group, made of four lens sheets, having a focusing function; a negative second group, made of three lens sheets, having a power-varying function; a negative third group, made of two lens sheets, for correcting the fluctuation in focal position caused by the power variation; a fourth group made of a positive front relay lens group having four lens sheets; and a fifth group made of a positive rear relay lens group having six lens sheets. At the time of varying power, the second and third groups are moved along the optical axis X while changing the gap between, whereby the focal length f of the whole system is changed, and the luminous flux is efficiently converged onto its imaging position.

In the zoom lens groups 21, a shutter (stop) 22 is disposed between the third and fourth groups.

Here, the fourth and fifth groups are disposed with a large gap therebetween, which is originally intended for a space for inserting a focal length conversion lens group (EXT group) for shifting the focal length of the zoom lens groups 21 to a telephoto side.

Figure 3:
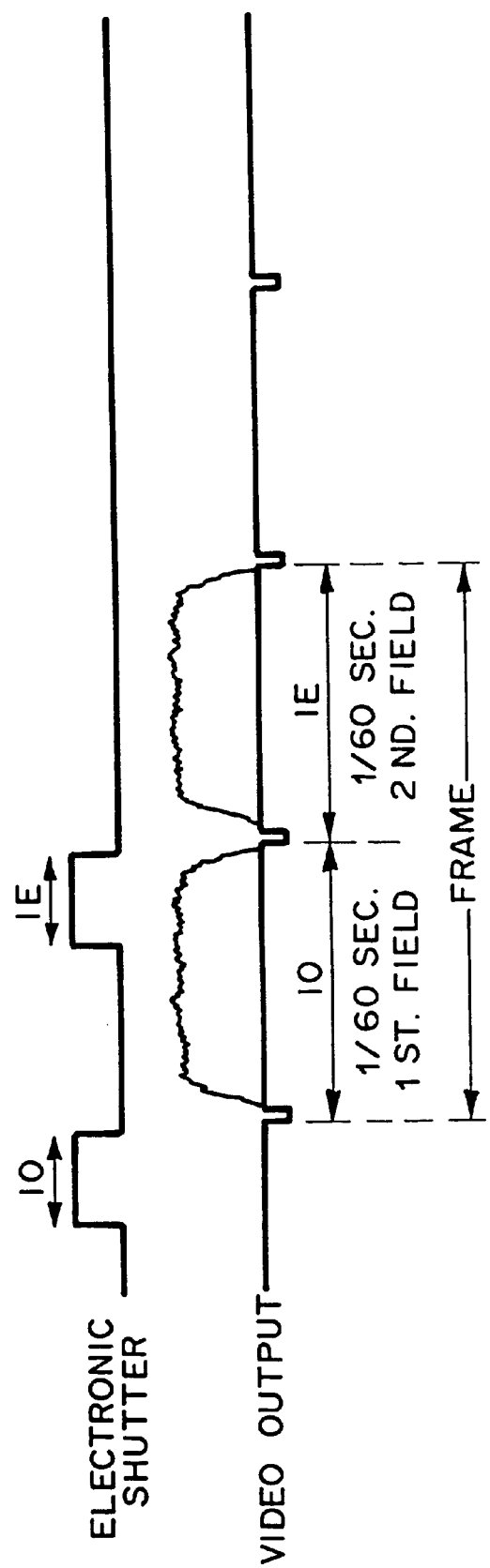
FIG. 3 is a time chart showing a relationship between charge storage periods and video signal outputting periods in the case where charges are stored in a CCD image-capturing device using an electronic shutter alone.

Meanwhile, the CCD image-capturing device 8d as the still-image-capturing device employs, as its signal transmission system, an interlacing system (30 frames/sec, 60 fields/sec) in conformity with NTSC, whereby the video signal output from the device 8d yields such a form as that shown in FIG. 3, which is divided into a first field (IO) and a second field (IE).

Each of the first field (IO) and second field (IE) constituting one frame of a still image has a period of 1/60 second.

In general, the CCD image-capturing device 8d has a function known as electronic shutter which can restrict the charge storage period corresponding to each of the above-mentioned fields to a predetermined period shorter than the signal output period of one field (1/60 second).

Though the shutter open period of the electronic shutter may vary depending on the structure of the CCD image-capturing device 8d, the above-mentioned interline structure (IT) can realize a variable-speed shutter within the range of about 1/60 to 1/2000 second.

FIG. 3 schematically shows this electronic shutter open period, and the respective letters noted above its H level periods refer to charge storage periods for obtaining images of the field periods corresponding to the letters.

In the case using such an electronic shutter, however, the respective charge storage periods of the first field (IO) and second field (IE) deviate from each other by 1/60 second, whereby the video signals for odd fields and even fields temporally shift from each other. As a consequence, if these video signals are reproduced to constitute one sheet of frame image, blurring will occur in the image.

Figure 4:
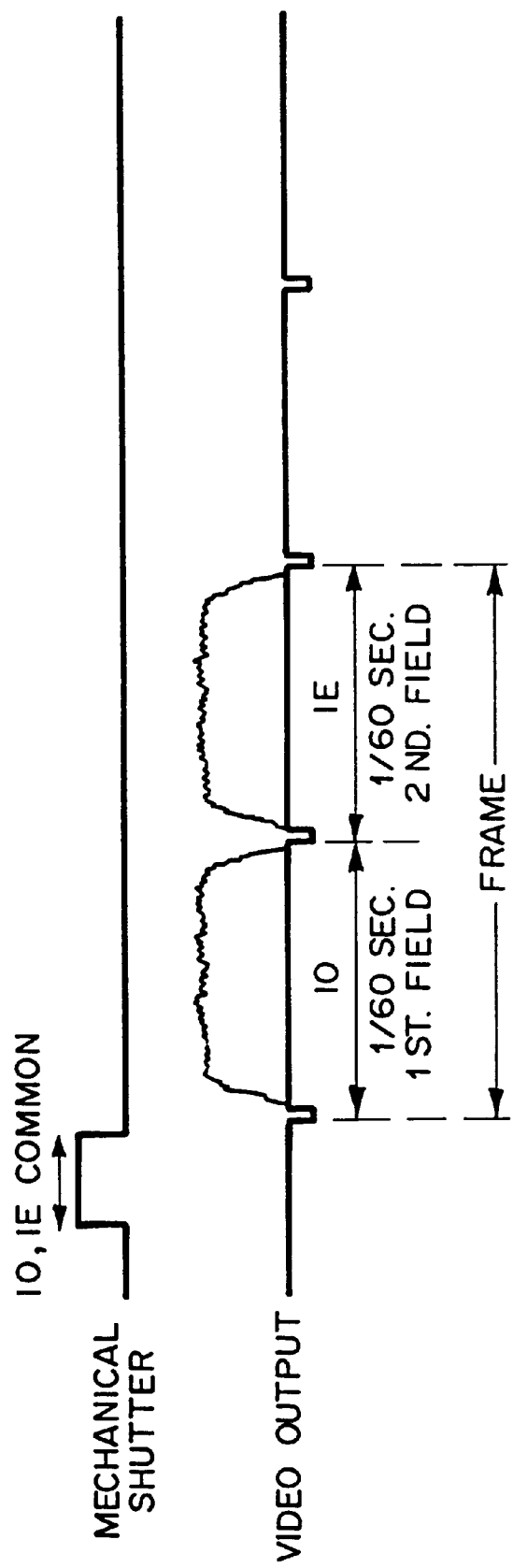
FIG. 4 is a time chart showing a relationship between charge storage periods and a video signal outputting periods in the case where charges are stored in a CCD image-capturing device using a mechanical shutter.

Therefore, in this embodiment, as shown in FIG. 2, the mechanical shutter 34 is disposed between the light exit end face 7d of the still-image-capturing prism 2d and the cover glass 6d, such that, as shown in FIG. 4, the shutter attains an open state only during one charge storage period in response to the image readout operation for one frame, and the image signal being read out whose charges are stored in this charge storage period is used for both the first field (IO) and second field (IE).

As a consequence, the respective charge storage periods of both fields have temporally the same timing, so that their respective video signals temporally coincide with each other, whereby no image blurring will occur if these video signals are reproduced to constitute one sheet of frame image.

Here, it is not always necessary for the video signals to be read out immediately after the open state period of the mechanical shutter 34 is terminated. Namely, the video signals may be read out after the lapse of a desired period from the storing of charges in the state where the mechanical shutter 34 is open. In this case, it is necessary that the mechanical shutter 34 be kept in a closed state until the video signal readout period is terminated after the storing of charges.

Regardless of whether the CCD image-capturing device 8d employs an interlacing system or not, in the case where an electronic shutter is used, as with this embodiment, a phenomenon known as smear is generated by light irradiating the light-receiving surface even in its shutter-off period, whereby the quality of reproduced image may deteriorate. In the configuration where the mechanical shutter 34 is used for inhibiting the light-receiving surface of the CCD image-capturing device 8d from being irradiated with light in the shutter-off period as mentioned above, by contrast, smear would not increase, whereby a reproduced image with less image quality deterioration can be obtained.

Here, smear refers to a phenomenon in which, when particularly strong light is incident on the light-receiving surface of a solid-state image-capturing device, a pseudo signal shaped like a bright band occurs above and below the part of a picture corresponding to the portion where the light is incident. This phenomenon occurs since the signal charge generated upon the incidence of light may intrude into other pixels or transmission lines due to diffusion or since the incident light is scattered within the device.

Figure 5:
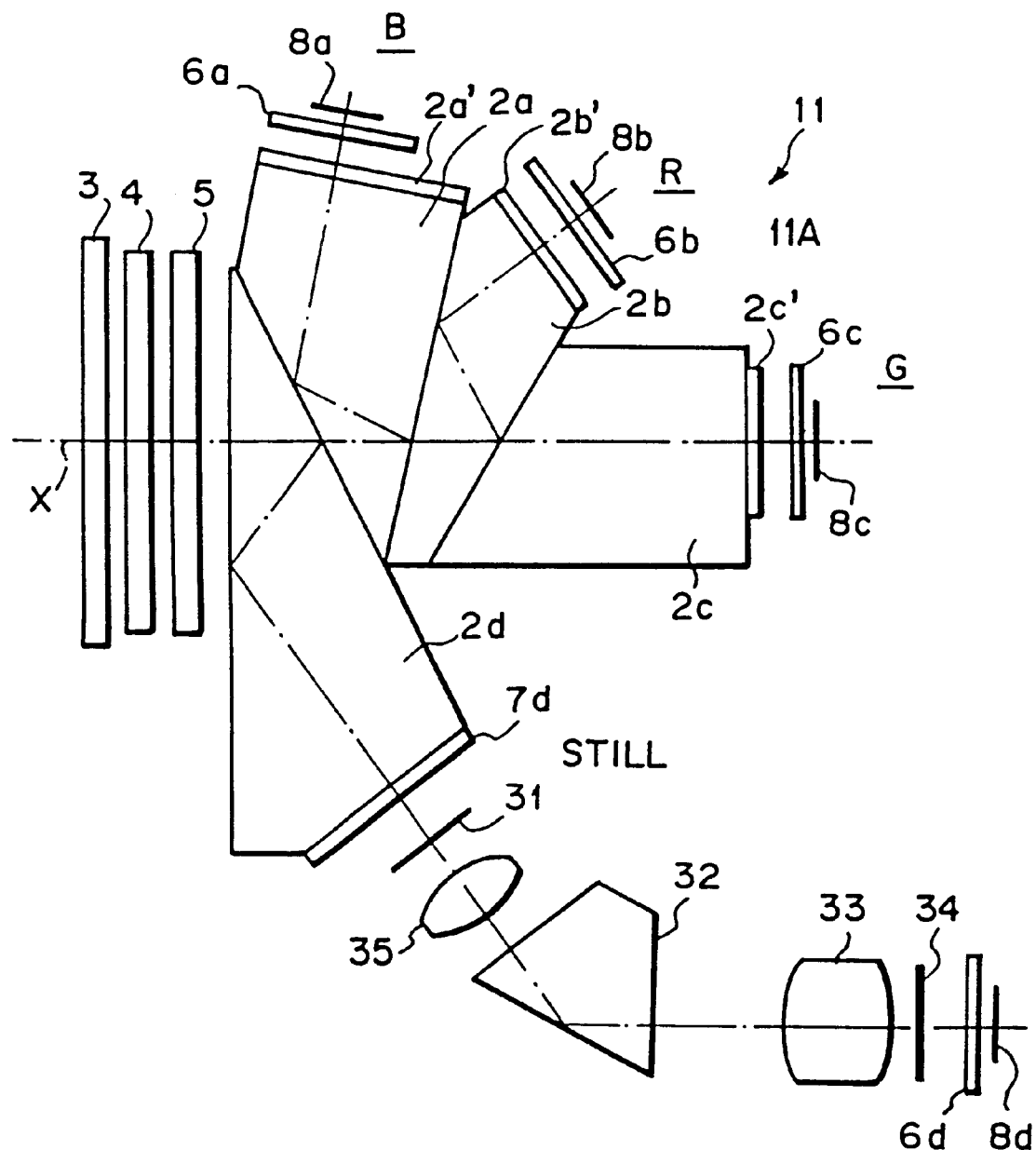
FIG. 5 is a schematic view showing an embodiment in which the TV lens shown in FIG. 2 is partly modified.

FIG. 5 is a schematic view showing the optical system for a TV camera equipped with a still-taking function in accordance with an embodiment different from the foregoing embodiment.

When employing a mechanical shutter for capturing a still image, it is necessary that the shutter 34 and a shutter driving section (not illustrated) be disposed between the light exit end face 7d of the still-image-capturing prism 2d and the CCD, image-capturing device 8d, whereby the optical system is preferably configured such that a space for disposing these members can be secured.

Therefore, in this embodiment, without the CCD image-capturing device 8d being disposed near the light exit end face 7d, the luminous flux emitted from the light exit end face 7d is caused to form an object image at an intermediate imaging surface 31, and the object image is finally formed, by way of a field lens 35 and a relay lens 33, onto the CCD image-capturing device 8d disposed at a position separated from the light exit end face 7d via the cover glass 6d. As a consequence, the space for disposing the shutter 34 and the like can be secured.

While a reflecting prism 32 is inserted in the optical path in order to change the advancing direction of the luminous flux, it is preferred that, since the image posture is vertically inverted when the luminous flux is once reflected by the reflecting prism 32, the image be electrically inverted after the image information is captured by the CCD imaging device 8d or the luminous flux be reflected at the reflecting prism 32 an even number of times. In place of the reflecting prism 32, a planar reflecting mirror can be used, of course.

Without being restricted to the above-mentioned embodiments, the optical system for a TV camera equipped with a still-taking function in accordance with the present invention can be modified in various manners. For example, the still-image-capturing prism 2d and the three-color-decomposing prisms 2a to 2c for capturing TV images may be formed as members separate from each other.

The lens groups constituting the TV lens system 2 is not restricted to zoom lens groups but may be of a fixed focus type.

Though the still-image-capturing prism 2d and the three-color-decomposing prisms 2a to 2c are interchangeable, these prisms will function as those for monochromatic images if any of the prisms 2a to 2c is employed as the still-image-capturing prism.

Without using a mechanical shutter in the optical path of the still-image-capturing system, the optical system for a TV camera equipped with a still-taking function in accordance with the present invention may use an electronic shutter alone as its shutter.

Though the above-mentioned embodiments use, as the CCD image-capturing device 8d for still images, that in conformity with NTSC, the signal transmission system of the CCD image-capturing device 8d is not limited thereto, of course. For example not only PAL system or SECAM system but also non-interlacing systems can be employed.

Further, though a single-sheet CCD image-capturing device is used in the above-mentioned embodiments, a single-sheet MOS image-capturing device can be used instead. Also, a three-sheet type can be used in place of the single-sheet type.

Thus, the optical system of the TV camera in accordance with these embodiments employs a four-block prism having the same shape as that of the existing four-block color-decomposing prism, so as to obtain both of color TV and color still images separately from each other, whereby the optical systems can be made easier and the manufacturing cost can be cut down.

As explained in the foregoing, since a still-image-luminous-flux-decomposing prism is disposed adjacent to the color-decomposing prism for capturing TV images provided in the TV camera main body, and the luminous flux deflected by the still-image-luminous-flux-decomposing prism is made incident on a still-image-capturing device, the optical system in accordance with the present invention is convenient in that one TV camera apparatus can take both TV and still images.

Also, since the lens sections of the TV-image-capturing system and still-image-capturing system are completely made in common with each other, the whole apparatus can be made compact and inexpensive. On the other hand, since the imaging device of the still-image-capturing system is provided separately from the imaging device of the TV-image-capturing system, the image quality of still images can be made favorable.

Also, when an existing glass block for four-block color-decomposing prism is used, with one of the four blocks being employed as the still-image-luminous-flux-decomposing prism, whereas the remaining three blocks being employed as a color-decomposing prism for three primary color light components, then the manufacturing process can be simplified, and the manufacturing cost can be cut down.

If a mechanical shutter is inserted in an optical path between the still-image-luminous-flux-decomposing prism and the still-image-capturing device, and the shutter attains an open state only during a charge storage period of the image-capturing device, then light can be inhibited from being made incident on the light-receiving surface thereof in the period other than the charge storage period, whereby smear can greatly be reduced, and images can be obtained with a high image quality.

It will be preferable if the luminous flux emitted from the still-image-luminous-flux-decomposing prism forms an object image once at a first imaging position, and then the object image is formed again on the still-image-capturing device disposed at a second imaging position by way of a relay lens, since a space for disposing a mechanical shutter member for taking still images and a shutter driving member can be secured between these two imaging positions.

In the case where the signal transmission system of the still-image-capturing device is of an interlacing type, when the mechanical shutter is configured such as attain an open state only during the charge storage period of a first field, while charges for one frame are allowed to be stored during this period, the charge storage periods of the first and second fields temporally attain the same timing, thus making the respective video signals of both fields temporally coincide with each other, whereby no blurring will occur if one sheet of frame image is constructed by reproducing these video signals.

What is claimed is:

1. An optical system for a TV camera including a color-decomposing prism disposed in a TV camera main body, said optical system comprising:

a still-image-luminous-flux-dividing prism, disposed adjacent to said color-decomposing prism, for dividing out a part of a luminous flux incident on said optical system such that thus divided part is guided to a still-image-capturing device;

wherein said color-decomposing prism is constituted by four blocks, one of said four blocks being used as said still-image-luminous-flux-dividing prism, the remaining three blocks being used as respective color-decomposing prisms for three primary color light components; and wherein, in said four blocks of said color-decomposing prism, the block closest to a luminous flux entrance side is used as said still-image-luminous-flux-dividing prism.

2. An optical system for a TV camera including a color-decomposing prism disposed in a TV camera main body, said optical system comprising:

a still-image-luminous-flux-dividing prism, disposed adjacent to said color-decomposing prism, for dividing out a part of a luminous flux incident on said optical system such that thus divided part is guided to a still-image-capturing device; and wherein a mechanical shutter is inserted in an optical path between said still-image-luminous-flux-dividing prism and said still-image-capturing device such as to attain an open state only during a charge storage period of said image-capturing device.

3. An optical system for a TV camera according to claim 2, wherein said still-image-capturing device has a signal transmission system of an interlacing type.

4. An optical system for a TV camera including a color-decomposing prism disposed in a TV camera main body, said optical system comprising:

a still-image-luminous-flux-dividing prism, disposed adjacent to said color-decomposing prism, for dividing out a part of a luminous flux incident on said optical system such that thus divided part is guided to a still-image-capturing device; and wherein the luminous flux emitted from said still-image-luminous-flux-dividing prism forms an object image at a first imaging position and then, by way of a relay lens, forms the object image again on said still-image-capturing device disposed at a second imaging position, said optical system including a mechanical shutter disposed between said first and second imaging positions.

5. An optical system for a TV camera according to claim 4, wherein said still-image-capturing device has a signal transmission system of an interlacing type.

* * * * *